(12) United States Patent
Negami et al.

(10) Patent No.: US 10,091,392 B2
(45) Date of Patent: Oct. 2, 2018

(54) IMAGE READING DEVICE, IMAGE READING METHOD, AND IMAGE READING PROGRAM

(71) Applicant: Hitachi Information & Telecommunication Engineering, Ltd., Kanagawa (JP)

(72) Inventors: Toyohiro Negami, Kanagawa (JP); Kazumi Suzuki, Kanagawa (JP)

(73) Assignee: Hitachi Information & Telecommunication Engineering, Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/501,476

(22) PCT Filed: Aug. 25, 2015

(86) PCT No.: PCT/JP2015/073813
§ 371 (c)(1),
(2) Date: Feb. 3, 2017

(87) PCT Pub. No.: WO2017/033275
PCT Pub. Date: Mar. 2, 2017

(65) Prior Publication Data
US 2017/0237875 A1      Aug. 17, 2017

(51) Int. Cl.
*H04N 1/04* (2006.01)
*H04N 1/387* (2006.01)
(Continued)

(52) U.S. Cl.
CPC ....... *H04N 1/3878* (2013.01); *G06K 9/00463* (2013.01); *G06K 9/4604* (2013.01);
(Continued)

(58) Field of Classification Search
CPC ............. G06K 9/00463; G06K 9/4604; H04N 1/3878; H04N 1/00718; H04N 1/00795; H04N 1/387; H04N 1/3873
(Continued)

(56) References Cited

U.S. PATENT DOCUMENTS 8,855,375 B2 * 10/2014 Macciola ............... H04N 1/387
358/448
8,971,589 B2 * 3/2015 Kato .................. G06K 9/00281
382/115
(Continued)

FOREIGN PATENT DOCUMENTS

JP        11288453 A  * 10/1999  ............... G06K 9/32
JP        2000-81964 A    3/2000
(Continued)

OTHER PUBLICATIONS

Supplementary European Search Report for Serial No. EP 15 89 9908 dated Feb. 27, 2018.

*Primary Examiner* — Cheukfan Lee
(74) *Attorney, Agent, or Firm* — McCormick, Paulding & Huber LLP

(57) ABSTRACT

The present invention provides a technique capable of obtaining image data without a missing part even in a case where a business form is not rectangular. An image reading device including a reading unit which reads an image of a business form, the image reading device includes a skew angle calculation unit which calculates a skew angle used for correcting inclination of the business form according to image data of the image read by the reading unit, a circumscribed region detection unit which generates an image after a first skew correction obtained by rotating the image according to the skew angle, scans the generated image after the first skew correction, and thus detects a circumscribed quadrangle circumscribed around the image of the business
(Continued)

form and included in the image after the first skew correction, and an image cutout unit which cuts out a business-form image after cutout from the image read by the reading unit, according to coordinates of four corner points of the circumscribed quadrangle.

7 Claims, 9 Drawing Sheets

(51) Int. Cl.
    *G06K 9/00*     (2006.01)
    *H04N 1/00*     (2006.01)
    *G06K 9/46*     (2006.01)

(52) U.S. Cl.
    CPC ..... *H04N 1/00718* (2013.01); *H04N 1/00795* (2013.01); *H04N 1/387* (2013.01); *H04N 1/3873* (2013.01)

(58) Field of Classification Search
    USPC .......................................... 358/488, 486, 448
    See application file for complete search history.

(56) References Cited

U.S. PATENT DOCUMENTS

| | | |
|---|---|---|
| 2005/0030567 A1 | 2/2005 | Narushima et al. |
| 2013/0182002 A1 | 7/2013 | Macciola et al. |

FOREIGN PATENT DOCUMENTS

| | | |
|---|---|---|
| JP | 2007-189577 A | 7/2007 |
| JP | 2010-171492 A | 8/2010 |

\* cited by examiner

FIG. 3
(a)
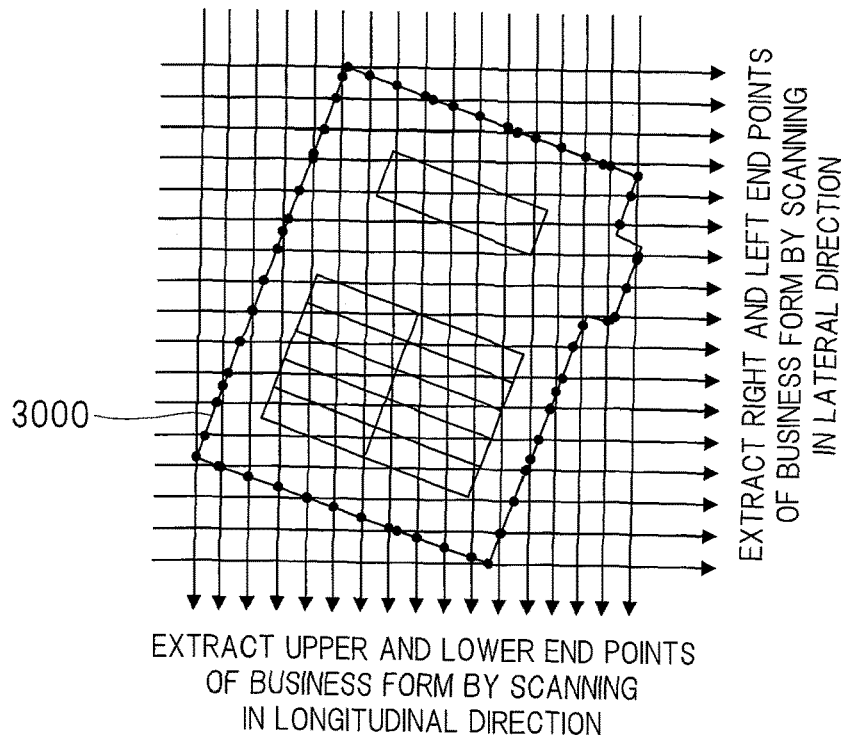
EXTRACT RIGHT AND LEFT END POINTS OF BUSINESS FORM BY SCANNING IN LATERAL DIRECTION
EXTRACT UPPER AND LOWER END POINTS OF BUSINESS FORM BY SCANNING IN LONGITUDINAL DIRECTION
(b)
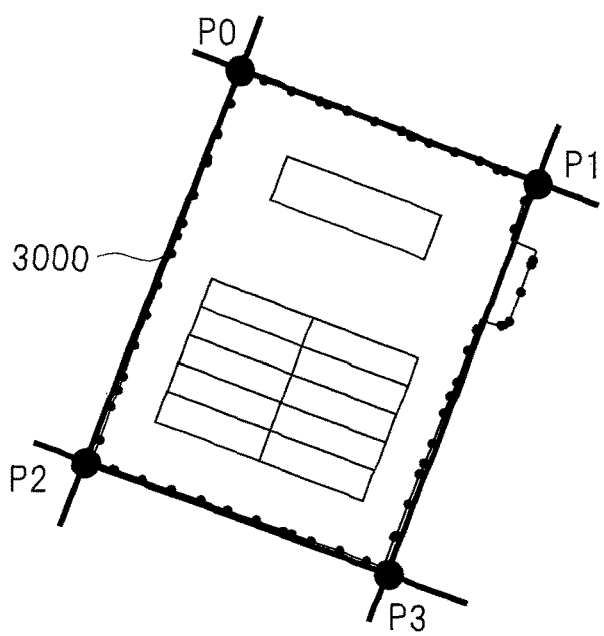

FIG. 5
(a)
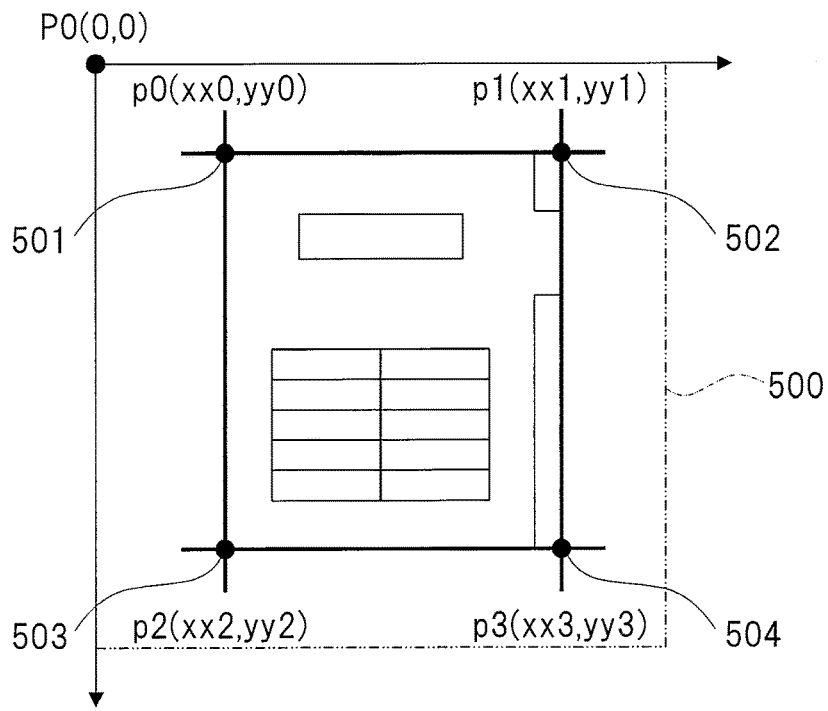
(b)
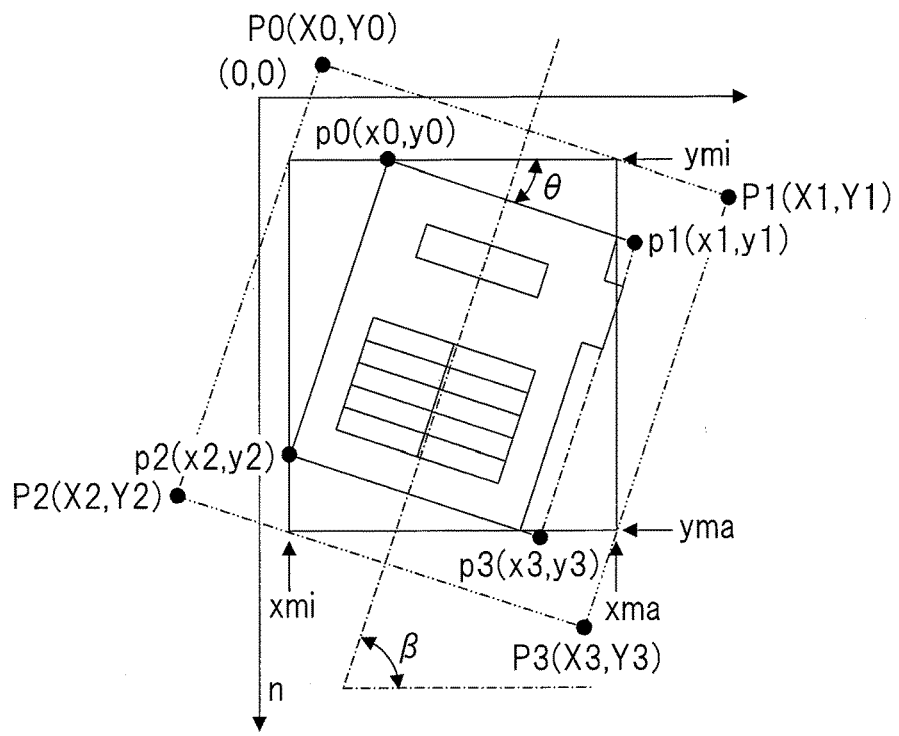

FIG. 6
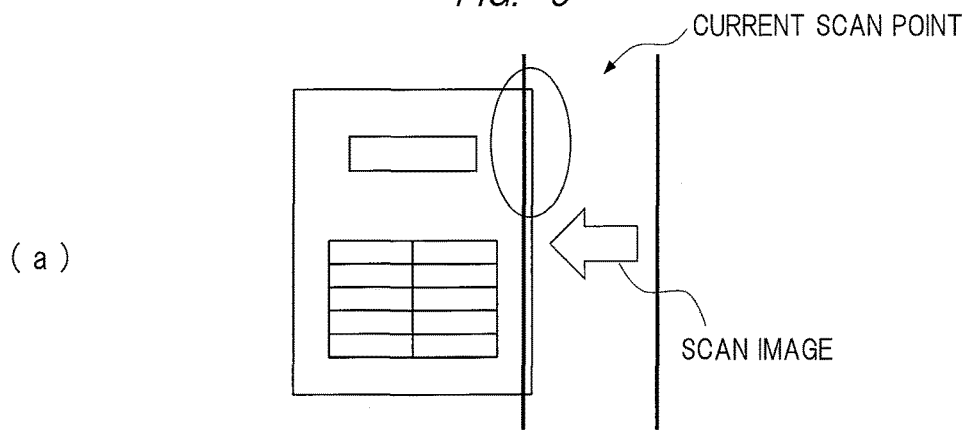
(a)
CURRENT SCAN POINT
SCAN IMAGE
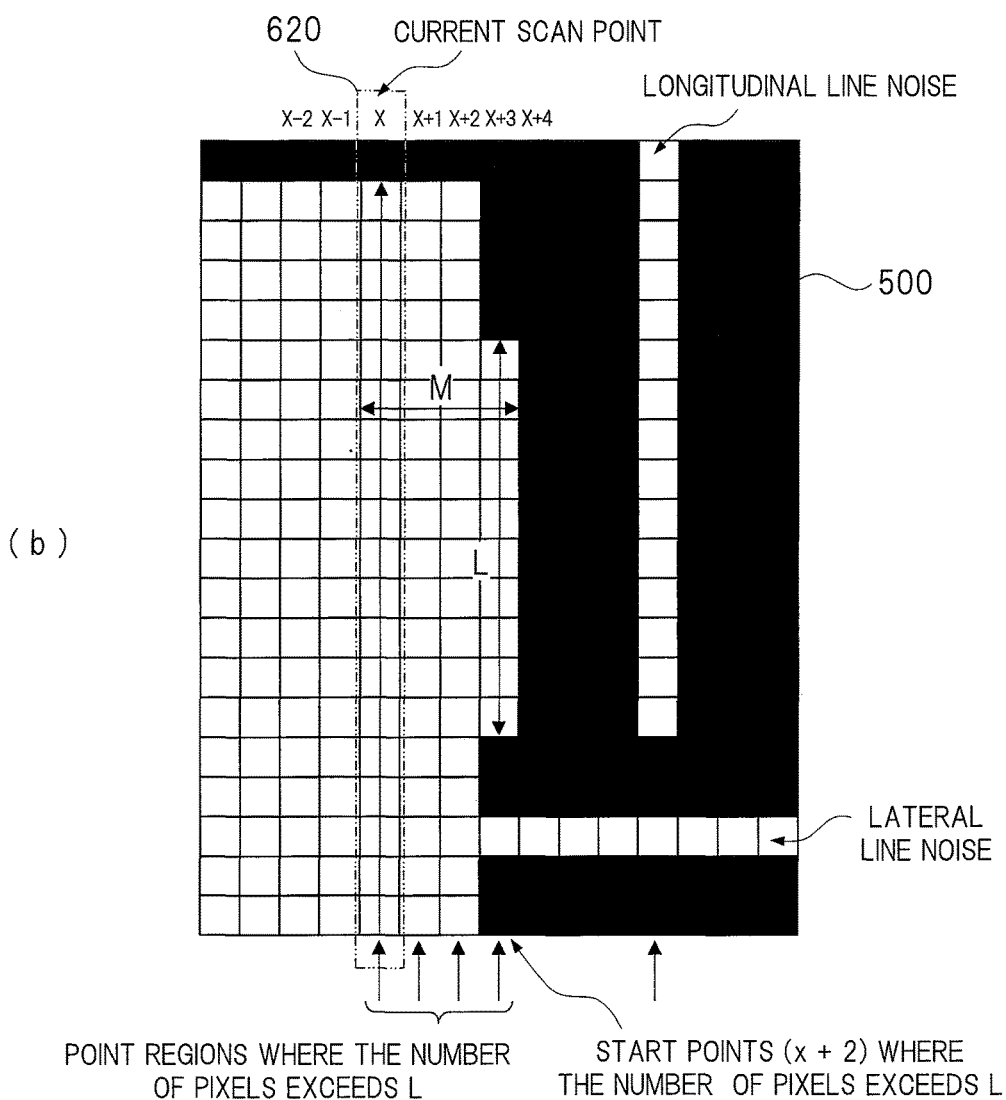
(b)
620  CURRENT SCAN POINT
X-2 X-1 X  X+1 X+2 X+3 X+4
LONGITUDINAL LINE NOISE
500
M
L
LATERAL LINE NOISE
POINT REGIONS WHERE THE NUMBER OF PIXELS EXCEEDS L
START POINTS (x + 2) WHERE THE NUMBER OF PIXELS EXCEEDS L FIG. 8
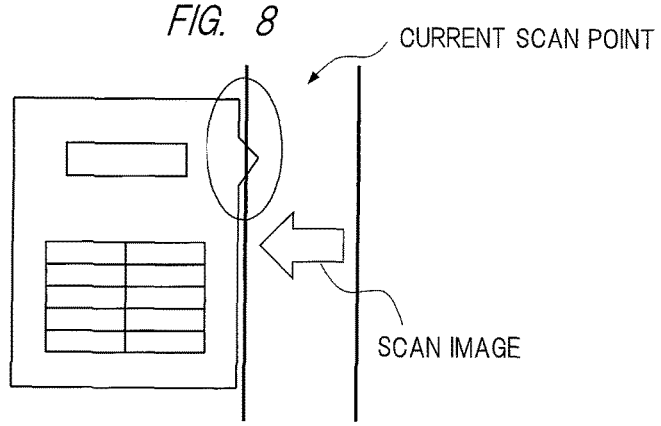
(a)
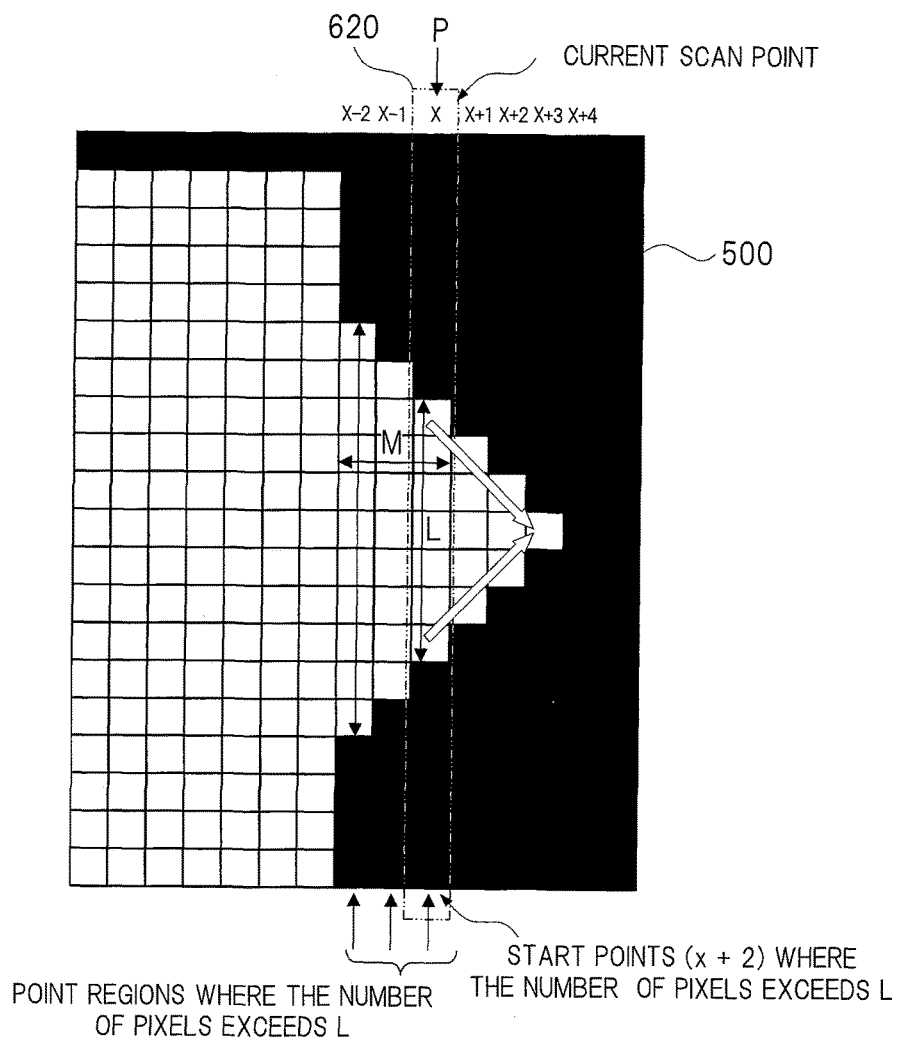
(b)

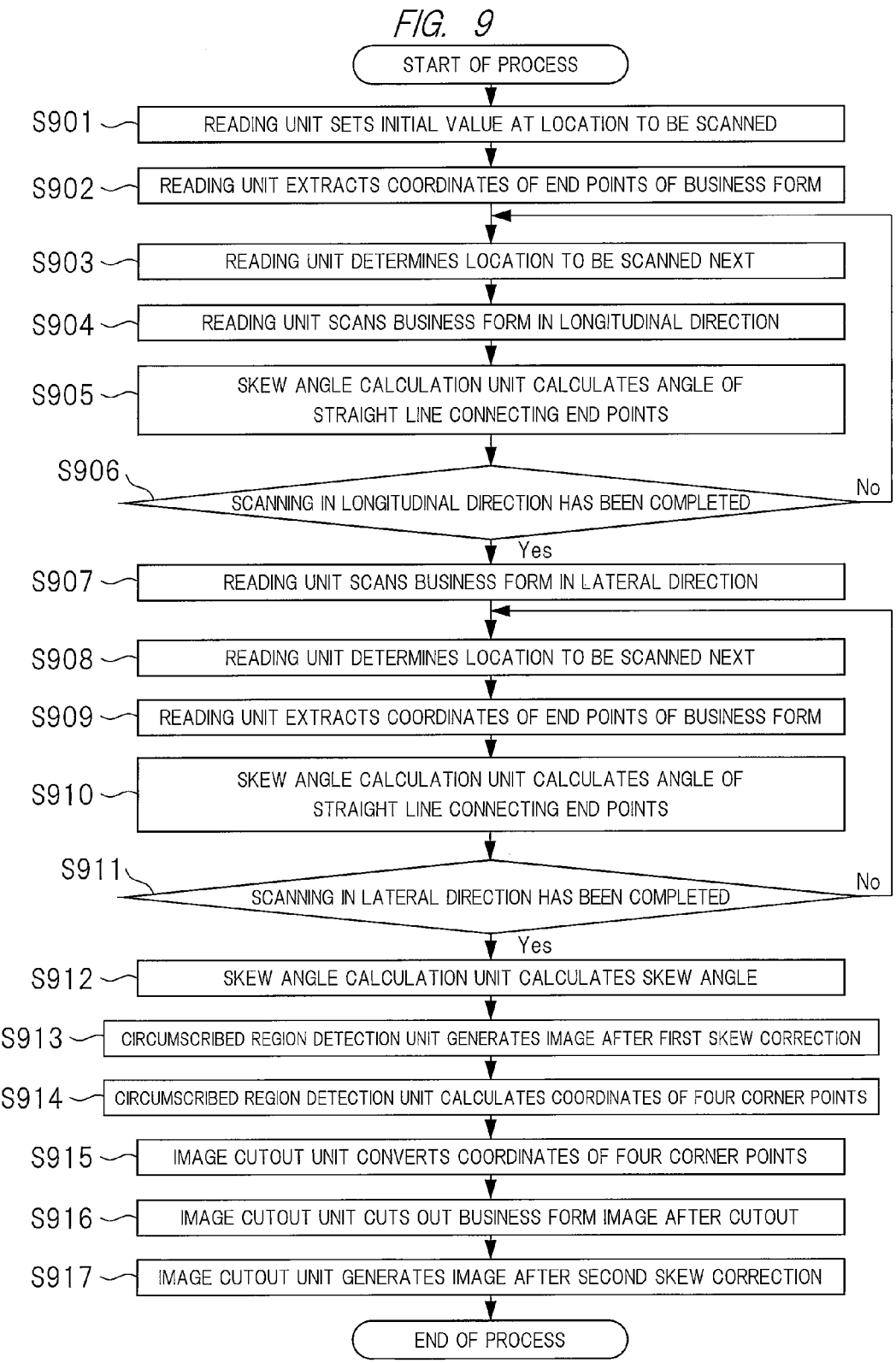

IMAGE READING DEVICE, IMAGE READING METHOD, AND IMAGE READING PROGRAM

CROSS-REFERENCE TO RELATED APPLICATION

This application is a National Stage application of International Patent Application No. PCT/JP2015/073813, filed on Aug. 25, 2015, which is hereby incorporated by reference in its entirety.

TECHNICAL FIELD

The present invention relates to an image reading device, an image reading method, and an image reading program.

BACKGROUND ART

An image reading device such as an OCR (Optical Character Reader) or a scanner detects an end of a business form by using the fact that the background of the business form is black, detects four corner points of the business form, performs skew correction, extracts characteristic components, and thus obtains character recognition results and image data.

When four corner points of a business form are detected and image data of the business form is acquired by using the above-described technique, there is a problem that only image data in which the image of a protruding portion (for example, a tab portion) is missing can be obtained in a case where the business form is not rectangular.

Japanese Patent Application Laid-Open Publication No. 2010-171492 discloses a technique, "an image processing device which processes an image of a document read by a reading device, the image processing device including: a recognition unit which recognizes that the read image of the document is an image of a tabbed sheet in which a tab portion is provided to protrude at a predetermined position of a business form main part; a separation unit which separates the image of the tab portion from the image of the tabbed sheet in a case where the image of the tabbed sheet is recognized by the recognition unit; and a generation unit which generates a tab embedded image having the same image size as the image size of the business form main part by superimposing the image of the tab portion separated by the separation unit on the image of the business form main part of the tabbed sheet from which the image of the tab portion is separated."

SUMMARY

With the technique disclosed in Japanese Patent Application Laid-Open Publication No. 2010-171492, even in a case where a business form is not rectangular, for example, in a case of a business form with a tab, image data in which a tab portion (protruding portion) is not missing can be obtained. However, in the technique disclosed in Japanese Patent Application Laid-Open Publication No. 2010-171492, the tab portion is superimposed on the image of a business form main part. As a result, in the technique disclosed in Japanese Patent Application Laid-Open Publication No. 2010-171492, a part of the image data of the business form main part is missing.

An object of the present invention is to provide a technique capable of obtaining image data without a missing part even in a case where a business form is not rectangular.

The typical ones of the inventions disclosed in the present application will be briefly described as follows.

According to an embodiment of the present invention, an image reading device including a reading unit which reads an image of a business form, the image reading device includes a skew angle calculation unit which calculates a skew angle used for correcting inclination of the business form according to image data of the image read by the reading unit, a circumscribed region detection unit which generates an image after a first skew correction obtained by rotating the image according to the skew angle, scans the generated image after the first skew correction, and thus detects a circumscribed quadrangle circumscribed around the image of the business form and included in the image after the first skew correction, and an image cutout unit which cuts out a business-form image after cutout from the image read by the reading unit, according to the circumscribed quadrangle.

Also, according to the embodiment of the present invention, an image reading method in an image reading device including a reading unit that reads an image of a business form, the method includes a skew angle calculation step in which a skew angle calculation unit calculates a skew angle used for correcting inclination of the business form according to image data of the image read by the reading unit, a circumscribed region detection step in which a circumscribed region detection unit generates an image after a first skew correction obtained by rotating the image according to the skew angle, scans the generated image after the first skew correction, and thus detects a circumscribed quadrangle circumscribed around the image of the business form and included in the image after the first skew correction, and an image cutout step in which an image cutout unit cuts out a business-form image after cutout from the image read by the reading unit, according to the circumscribed quadrangle.

Also, according to the embodiment of the present invention, an image reading program causing a computer of an image reading device including a reading unit that reads an image of a business form to execute a process, the process includes a skew angle calculation step in which a skew angle calculation unit calculates a skew angle used for correcting inclination of the business form according to image data of the image read by the reading unit, a circumscribed region detection step in which a circumscribed region detection unit generates an image after a first skew correction obtained by rotating the image according to the skew angle, scans the generated image after the first skew correction, and thus detects a circumscribed quadrangle circumscribed around the image of the business form and included in the image after the first skew correction, and an image cutout step in which an image cutout unit cuts out a business-form image after cutout from the image read by the reading unit, according to the circumscribed quadrangle.

Effects obtained by the typical ones of the inventions disclosed in the present application will be briefly described as follows.

According to a representative embodiment of the present invention, image data without a missing part can be obtained even in a case where a business form is not rectangular.

BRIEF DESCRIPTIONS OF THE DRAWINGS

FIG. 3(a) is a diagram for explaining a reading method in a conventional image reading device and for explaining a process of extracting end points of a business form by scanning the business form in longitudinal and lateral directions;

FIG. 3(b) is a diagram for explaining the reading method in the conventional image reading device and for explaining a process of extracting coordinates of four corner points of the business form;

Figure 4:
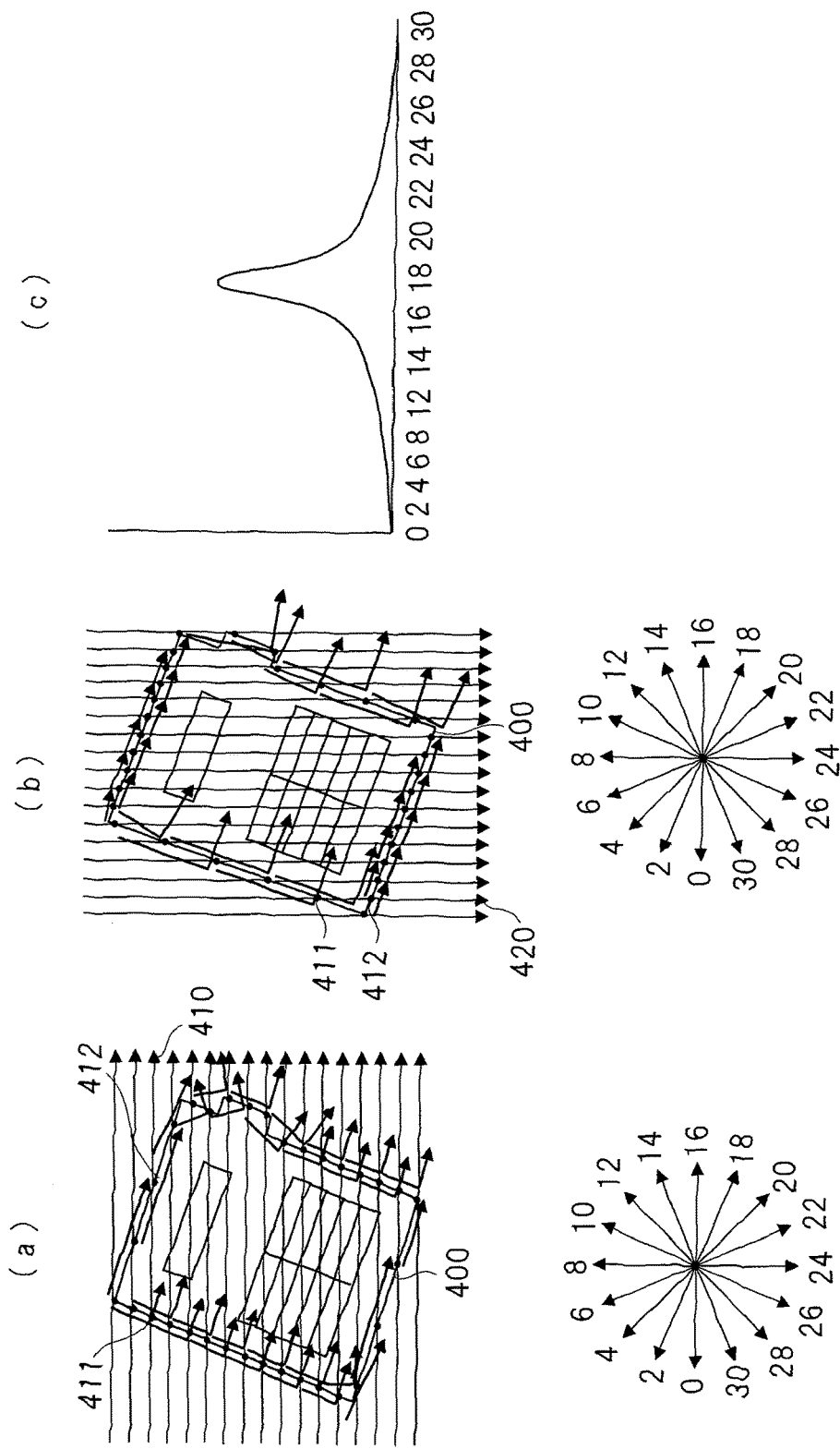

FIGS. 4(a) to 4(c) are diagrams for explaining a process of calculating a skew angle of the image reading device according to the embodiment of the present invention;

FIG. 5(a) is a diagram illustrating an example of an image after a first skew correction generated by a circumscribed region detection unit according to the embodiment of the present invention;

FIG. 5(b) is a diagram illustrating an example where an image cutout unit according to the embodiment of the present invention cuts out an image of a business form according to coordinates of four corner points of a circumscribed quadrangle;

FIGS. 6(a) and 6(b) are diagrams for explaining a process where the circumscribed region detection unit according to the embodiment of the present invention detects a circumscribed region of the business form according the image after the first skew correction;

FIGS. 7(a) and 7(b) are diagrams for explaining a process where the circumscribed region detection unit according to the embodiment of the present invention detects a circumscribed region of the business form according the image after the first skew correction;

FIGS. 8(a) and 8(b) are diagrams for explaining a process where the circumscribed region detection unit according to the embodiment of the present invention detects a circumscribed region of the business form according the image after the first skew correction; and FIG. 9 is a diagram illustrating an outline of the entire process according to the embodiment of the present invention.

DETAILED DESCRIPTION

Hereinafter, an embodiment of the present invention will be described in detail with reference to the accompanying drawings. Note that components having the same function are denoted by the same reference characters throughout the drawings for describing the embodiment, and the repetitive description thereof is omitted.

Configuration Example

Figure 1:
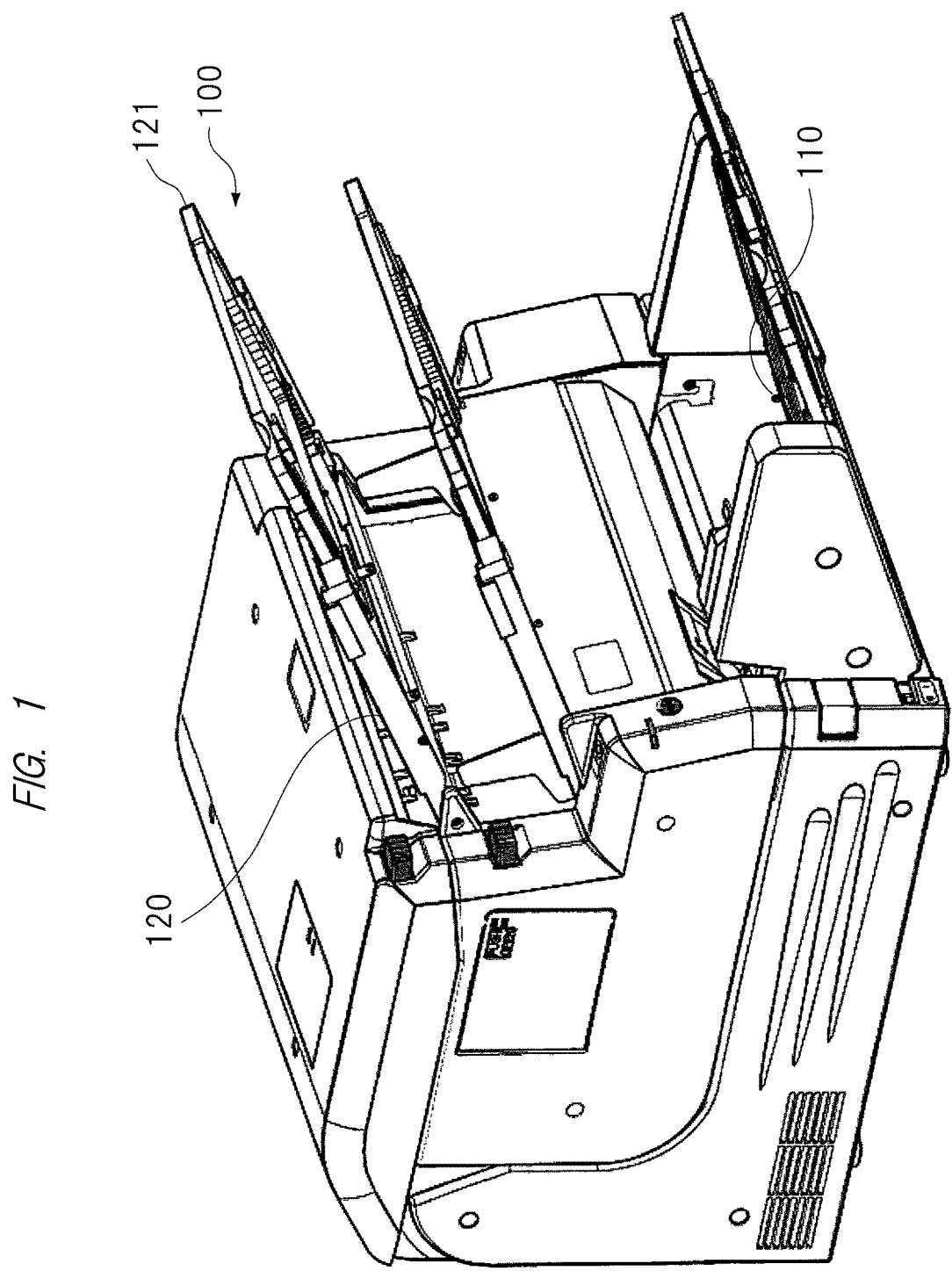
FIG. 1 is a perspective view illustrating an outline of a configuration example of an image reading device according to an embodiment of the present invention.
Figure 2:
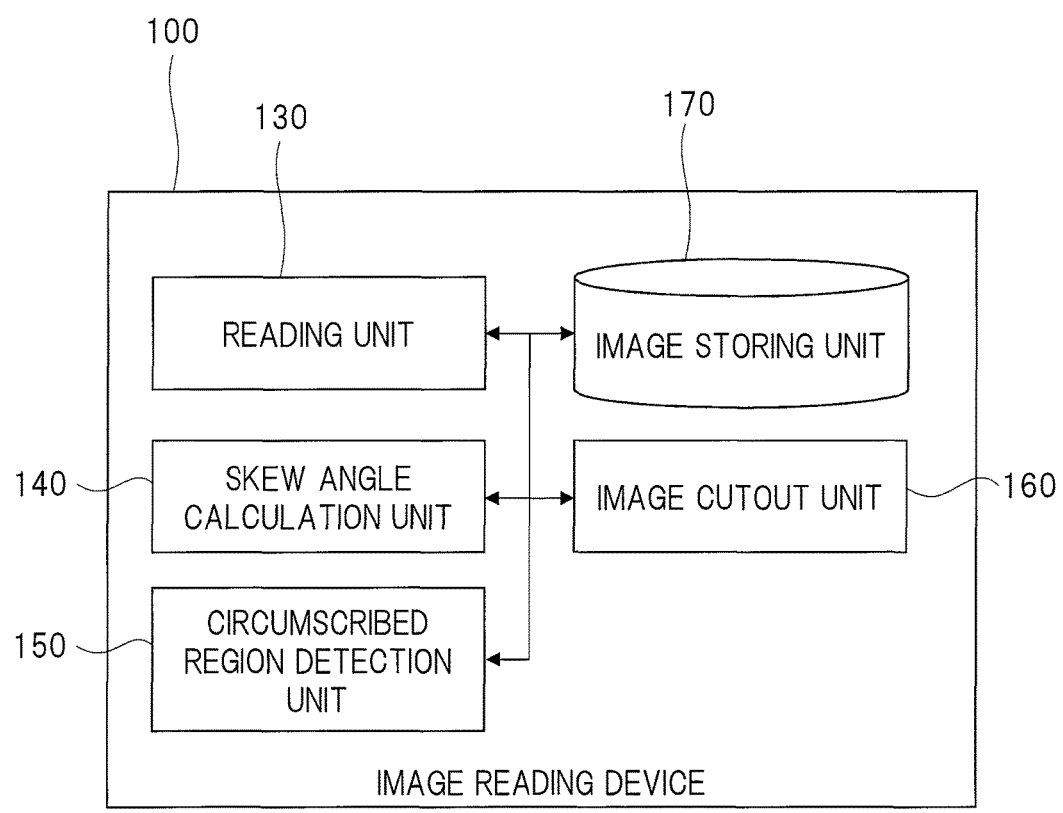
FIG. 2 is a block diagram illustrating an outline of the image reading device according to the embodiment of the present invention.

FIG. 1 is a perspective view illustrating an outline of a configuration example of an image reading device 100 according to an embodiment of the present invention. FIG. 2 is a block diagram illustrating an outline of the image reading device 100 according to the embodiment of the present invention.

As illustrated in FIG. 1, the image reading device 100 includes a suction port 110 through which a business form (a document used in a predetermined operation, for example, a bill or a check) is sucked, and a discharge port 120 through which the business form sucked in from the suction port 110 is discharged.

In addition, the image reading device 100 is implemented as predetermined hardware or software. For example, the image reading device 100 is configured of a computer including a processor, a memory, and the like, and a program recorded in the memory and executed by the processor causes the computer to function as the image reading device 100.

The business form sucked through the suction port 110 is moved to the inside of the image reading device 100 by a transport roller (not illustrated), and is placed on a background section whose color is black. Then, the image of the business form is read in a state where the business form is placed on the background section. Thus, image data of the business form is obtained by a reading unit 130.

The business form whose image data is obtained is transported by the transport roller to the outside of the image reading device 100 through the discharge port 120. The business form discharged through the discharge port 120 is accumulated on a stacker 121.

As illustrated in FIG. 2, the image reading device 100 includes the reading unit 130, a skew angle calculation unit 140, a circumscribed region detection unit 150, an image cutout unit 160, and an image storing unit 170.

The reading unit 130 reads the image of the business form by scanning the business form placed on the background section whose color is black. Thus, the reading unit 130 obtains image data of the business form.

The skew angle calculation unit 140 calculates a skew angle indicating the degree of inclination (inclination in the horizontal direction with respect to the background section) of the business form according to the image data of the image read by the reading unit 130. The skew angle calculation unit 140 inputs the calculated skew angle to the circumscribed region detection unit 150 and the image cutout unit 160.

The circumscribed region detection unit 150 generates an image after a first skew correction (to be described later, FIG. 5(a)) obtained by rotating (correcting in a normal direction) the image read by the reading unit 130 according to the skew angle calculated by the skew angle calculation unit 140.

In addition, the circumscribed region detection unit 150 scans the generated image after the first skew correction, and thus detects a circumscribed quadrangle circumscribed around the image of the business form and included in the image after the first skew correction. The circumscribed region detection unit 150 inputs coordinates of four corner points of the detected circumscribed quadrangle to the image cutout unit 160.

The image cutout unit 160 cuts out the image of the business form (business-form image after cutout) from the image (business-form image) read by the reading unit 130 according to the coordinates of the four corner points of the circumscribed quadrangle detected by the circumscribed region detection unit 150.

In addition, the image cutout unit 160 generates an image after a second skew correction obtained by rotating the cutout image of the business form (business-form image after cutout) according to the skew angle input by the skew angle calculation unit 140. Then, the image cutout unit 160 stores the generated image after the second skew correction in the image storing unit 170.

FIGS. 3(a) and 3(b) are diagrams for explaining the reading method in the conventional image reading device. FIG. 3(a) is a diagram for explaining a process of extracting end points of a business form 3000 by scanning the business form in longitudinal and lateral directions, and FIG. 3(b) is a diagram for explaining a process of extracting four corner points of the business form.

As illustrated in FIG. 3(a), the conventional image reading device scans the business form in the longitudinal direction and thus extracts an intersection between each scan line in the longitudinal direction and ends of the business form as an end point of the business form. In addition, the image reading device scans the business form in the lateral direction and thus extracts an intersection between each scan line in the lateral direction and ends of the business form as an end point of the business form.

Next, as illustrated in FIG. 3(b), the image reading device extracts four edges by using the least-square method from the extracted end points of the business form, and extracts intersections of the extracted four edges as four corner points (P0 to P3) of the business form. Then, the image reading device cuts out the image of the business form according to the extracted four corner points (P0 to P3), and performs skew correction for the cutout image.

Here, in a case where four edges are extracted by using the least-square method, a side (straight line P1-P3) not including a tab is extracted as an edge even though the tab is actually included in the straight line P1-P3 portion. Then, in a case where the image of the business form is cut out according to the four corner points, which are intersections of the four edges, there is a problem that only image data where the image of a tab portion (protruding portion) is missing can be obtained.

FIGS. 4(a) to 4(c) are diagrams for explaining a process of calculating a skew angle of the image reading device 100 according to the embodiment of the present invention.

As illustrated in FIG. 4(a), the reading unit 130 of the image reading device 100 scans a business form 400 in the lateral direction at predetermined intervals, and extracts intersections between scan lines 410 in the lateral direction and ends of the business form 400 as end points of the business form.

In detail, the reading unit 130 extracts the location where the color of the scanned location changes from a background color to a business-form color (color other than the background color) as a first end point 411, and then extracts the location where the color of the scanned location changes from the business-form color to the background color as a second end point 412. The reading unit 130 scans the business form 400 in the lateral direction at predetermined intervals. Therefore, the reading unit 130 extracts the first end point 411 and the second end point 412 for each scanned location.

The reading unit 130 inputs the extracted first end point 411 and second end point 412 into the skew angle calculation unit 140 every time the reading unit 130 extracts the first end point 411 and the second end point 412.

The skew angle calculation unit 140 calculates the angle of the straight line connecting the coordinates of the first end point 411 previously input and the coordinates of the first end point 411 most recently input. In addition, the skew angle calculation unit 140 calculates the angle of the straight line connecting the coordinates of the second end point 412 previously input and the coordinates of the second end point 412 most recently input. Note that, in a case where the calculated angle is outside the range from 135° to 225° (equal to or greater than 135° and equal to or less than 225°), the skew angle calculation unit 140 performs correction such that the calculated angle falls within the range from 135° to 225° (12 to 20 in the figure) by adding one of the values 90°, 180°, and 270° to the calculated angle. Note that, in a case where the angle does not fall within the range from 135° to 225° even when one of the values 90°, 180°, and 270° are added to the calculated angle, the skew angle calculation unit 140 may abandon the calculated angle.

As illustrated in FIG. 4(b), the reading unit 130 of the image reading device 100 scans the business form 400 in the longitudinal direction at predetermined intervals, and extracts intersections between scan lines 420 in the longitudinal direction and ends of the business form 400 as end points of the business forms 400.

In detail, the reading unit 130 extracts the location where the color of the scanned location changes from the background color to the business-form color (color other than the background color) as the first end point 411, and then extracts the location where the color of the scanned location changes from the business-form color to the background color as the second end point 412. The reading unit 130 scans the business form 400 in the longitudinal direction at predetermined intervals. Therefore, the reading unit 130 extracts the first end point 411 and the second end point 412 for each scanned location.

The reading unit 130 inputs the extracted first end point 411 and second end point 412 into the skew angle calculation unit 140 every time the reading unit 130 extracts the first end point 411 and the second end point 412 at predetermined intervals.

The skew angle calculation unit 140 calculates the angle of the straight line connecting the coordinates of the first end point 411 previously input and the coordinates of the first end point 411 most recently input. In addition, the skew angle calculation unit 140 calculates the angle of the straight line connecting the coordinates of the second end point 412 previously input and the coordinates of the second end point 412 most recently input. Note that, in a case where the calculated angle is outside the range from 135° to 225° (equal to or greater than 135° and equal to or less than 225°), the skew angle calculation unit 140 performs correction such that the calculated angle falls within the range from 135° to 225° by adding one of the values 90°, 180°, and 270° to the calculated angle. Note that, in a case where the angle does not fall within the range from 135° to 225° even when one of the values 90°, 180°, and 270° are added to the calculated angle, the skew angle calculation unit 140 may abandon the calculated angle.

As illustrated in FIG. 4(c), the skew angle calculation unit 140 counts the number of all the calculated angles (in a case where an angle is corrected, the angle after correction) for each angle. Then, the skew angle calculation unit 140 calculates the angle most frequently appearing as a result of counting, as the skew angle. Then, the skew angle calculation unit 140 inputs the calculated skew angle to the circumscribed region detection unit 150 and the image cutout unit 160.

In the example illustrated in FIG. 4(c), the value 202° (18 in the figure) most frequently appears among the angles counted by the skew angle calculation unit 140. Therefore, the skew angle calculation unit 140 calculates 202° as the skew angle. Note that the skew angle calculation unit 140 may calculate the average value of all the calculated angles (in a case where an angle is corrected, the angle after correction) as the skew angle. In addition, the skew angle calculation unit 140 may calculate the median value of all the calculated angles (in a case where an angle is corrected, the angle after correction) as the skew angle.

The circumscribed region detection unit 150 generates an image 500 after the first skew correction illustrated in FIG.

5(a) by rotating the business-form image read by scanning the business form by the skew angle input from the skew angle calculation unit 140.

Then, the circumscribed region detection unit 150 scans the generated image 500 after the first skew correction and calculates p0 (xx0, yy0), which is coordinates of a corner point 501, p1 (xx1, yy1), which is coordinates of a corner point 502, p2 (xx2, yy2), which is coordinates of a corner point 503, and p3 (xx3, yy3), which is coordinates of a corner point 504, the corner points 501 to 504 being the four corner points of the circumscribed region in the image 500 after the first skew correction. A specific method of calculating the coordinates p0 of the four corner point 501 to p3 of the four corner point 504 of the circumscribed region in the image 500 after the first skew correction by the circumscribed region detection unit 150 will be described later with reference to FIGS. 6 to 8.

Next, as illustrated in FIG. 5(b), the image cutout unit 160 converts the calculated coordinates p0 (xx0, yy0) to p3 (xx3, yy3) of the four corner points 501 to 504 of the circumscribed region in the image after the first skew correction into coordinates p0 (x0, y0) to p3 (x3, y3) of the four corner points of the circumscribed region in the business-form image.

In detail, the image cutout unit 160 converts the coordinates p0 (xx0, yy0) into the coordinates p0 (x0, y0) by using the following formulae (1) and (2).

$$p0(x0)=X0+\cos\theta \times xx0-\sin\theta \times yy0 \quad \text{Formula (1):}$$

$$p0(y0)=Y0+\cos\theta \times yy0+\sin\theta \times xx0 \quad \text{Formula (2):}$$

In addition, the image cutout unit 160 converts the coordinates p1 (xx1, yy1) into the coordinates p1 (x1, y1) by using the following formulae (3) and (4).

$$p1(x1)=X0+\cos\theta \times xx1-\sin\theta \times yy1 \quad \text{Formula (3):}$$

$$p1(y1)=Y0+\cos\theta \times yy1+\sin\theta \times xx1 \quad \text{Formula (4):}$$

In addition, the image cutout unit 160 converts the coordinates p2 (xx2, yy2) into the coordinates p2 (x2, y2) by using the following formulae (5) and (6).

$$p2(x2)=X0+\cos\theta \times xx2-\sin\theta \times yy2 \quad \text{Formula (5):}$$

$$p2(y2)=Y0+\cos\theta \times yy2+\sin\theta \times xx2 \quad \text{Formula (6):}$$

In addition, the image cutout unit 160 converts the coordinates p3 (xx3, yy3) into the coordinates p3 (x3, y3) by using the following formulae (7) and (8).

$$p3(x3)=X0+\cos\theta \times xx3-\sin\theta \times yy3 \quad \text{Formula (7):}$$

$$p3(y3)=Y0+\cos\theta \times yy3+\sin\theta \times xx3 \quad \text{Formula (8):}$$

The image cutout unit 160 cuts out a business-form image after cutout from the business-form image according to the converted coordinates p0 (x0, y0) to p3 (x3, y3) of the four corner points of the circumscribed region in the business-form image and a parameter for specifying the cutout range of the business-form image after cutout from the business-form image. For example, there is a case where a range larger than a rectangle joining the coordinates p0 (x0, y0) to p3 (x3, y3) of the four corner points is specified as the cutout range of the business-form image after cutout according to a parameter. In that case, from the business-form image, the image cutout unit 160 cuts out the business-form image after cutout into the size allowing the rectangle joining the coordinates p0 (x0, y0) to p3 (x3, y3) of the four corner points to be included with a predetermined (for example, 15-mm) margin around the outer periphery of the rectangle.

The image cutout unit 160 generates an image after a second skew correction by rotating the business-form image after cutout by the skew angle. Then, the image cutout unit 160 stores the generated image after the second skew correction in the image storing unit 170.

Next, the specific method of calculating the coordinates p0 of the four corner point 501 to p3 of the four corner point 504 of the circumscribed region in the image after the first skew correction (described before, FIG. 5(a)) will be described with reference to FIGS. 6 to 8.

FIG. 6 is diagrams for explaining a process of detecting the circumscribed region of the business form without the possibility that the circumscribed region detection unit 150 according to the embodiment of the present invention erroneously recognizes lateral-line noise 601 in the lateral direction and longitudinal-line noise 602 in the longitudinal direction as a part of the business form.

The circumscribed region detection unit 150 scans the image 500 after the first skew correction skew-corrected by being rotated by the skew angle in the lateral direction (for example, from right to left, or from left to right), then scans the image in the longitudinal direction (for example, from upper to lower or from lower to upper), and calculates the four corner points of the circumscribed region of the business-form image included in the image 500 after the first skew correction. Thus, the circumscribed region detection unit 150 detects the circumscribed region of the business-form image included in the image 500 after the first skew correction.

As illustrated in FIG. 6, the circumscribed region detection unit 150 scans the image after the first skew correction in the lateral direction.

The circumscribed region detection unit 150 calculates the number of continuous pixels in the business form color (hereinafter, referred to as the number of continuous business form pixels, in some cases) included in the scanned range every time a scan line 620 extending in the longitudinal direction scans the image after the first skew correction by one column in the lateral direction (from right to left), and holds the calculated number of continuous business form pixels. Then, every time the circumscribed region detection unit 150 calculates the number of continuous business form pixels, the circumscribed region detection unit 150 determines whether or not the number of continuous business form pixels calculated for each scanning of most recent M (second value) times consecutively exceeds L (first value) M times. In a case where the calculated number of continuous business form pixels consecutively exceeds L (first value) M (second value) times, the circumscribed region detection unit 150 detects the location (X+2 in the figure) scanned by the scan line 620 when the number of continuous business form pixels exceeds L at first as the circumscribed region of the business form (boundary between the business form and the background image).

Note that the lateral-line noise 601 in the lateral direction is less likely to be erroneously recognized as the business form by increasing the value of L.

In addition, a longitudinal-line noise in the longitudinal direction (noise exceeding the value of L) is less likely to be erroneously recognized as the business form by increasing the value of M.

By detecting the circumscribed region of the business form (boundary between the business form and the background image) through the above-described method, resistance to the lateral-line noise 601 and the longitudinal-line noise 602 can be enhanced. In addition, even when a corner of the business form is arc-shaped, the circumscribed region of the business form can be stably detected.

Figure 7:
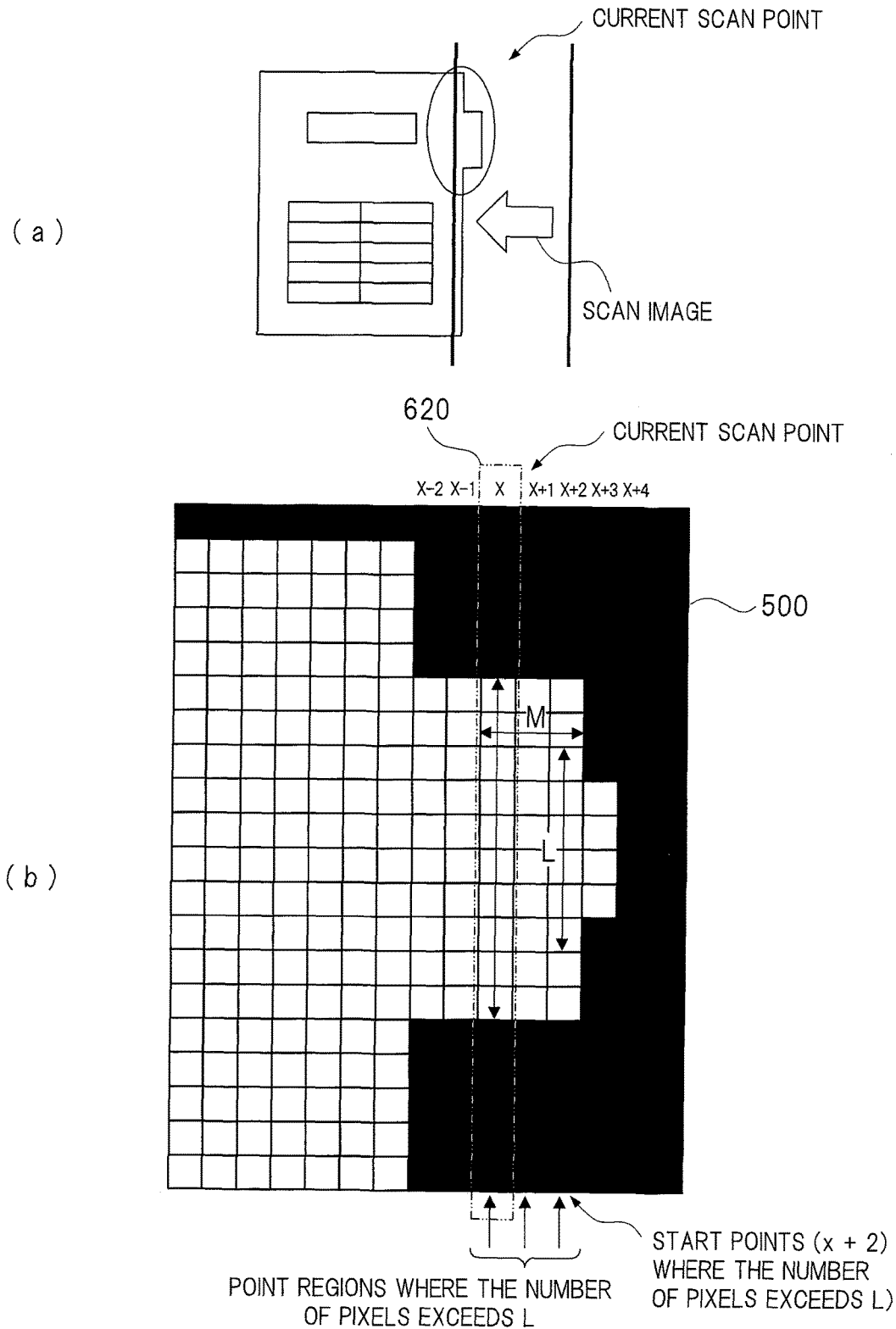

Note that, as illustrated in FIG. 7, in the case of detecting the edges of a tab-sheet business form, the value of L is set to be smaller than the height (length in the longitudinal direction) of a tab. Thus, the border between the tab and the background image can be detected as the circumscribed region of the business form. In addition, the tab and the business form can be distinguished from each other. In contrast, by setting the value of L to be greater than the height of the tab, only the business form portion excluding the tab can be detected as the circumscribed region.

Next, a process of detecting the edges of a business form a corner part of which is protruded since a part (corner part) of the business form is tapered toward the outside (hereinafter, referred to as a protruding business form, in some cases) will be described with reference to FIG. 8.

First, the circumscribed region detection unit 150 calculates the number of continuous business form pixels included in the scanned range every time the scan line 620 in the longitudinal direction scans an image after the first skew correction by one column from right to left, and holds the calculated number of continuous business form pixels. Then, every time the circumscribed region detection unit 150 calculates the number of continuous business form pixels, the circumscribed region detection unit 150 determines whether or not the calculated number of continuous business form pixels exceeds L. Then, the circumscribed region detection unit 150 traces the numbers of continuous business form pixels calculated so far from the location where the number exceeds L (X in the figure) to the right (to the outside of the business form). Note that the circumscribed region detection unit 150 traces the numbers of continuous business form pixels on the assumption that the numbers will continuously decrease. Then, the circumscribed region detection unit 150 detects the location (X+3 in the figure) immediately before the location where the number of continuous business form pixels becomes 0 as the circumscribed region of the business form (boundary between the business form and the background image). Thus, the circumscribed region including the protruding part (corner part) of the protruding business form can be detected.

<Entire Process>

FIG. 9 is a diagram illustrating an outline of the entire process according to the embodiment of the present invention.

First, in S901, the reading unit 130 sets an initial value (for example, 0) to the X coordinate for specifying the location of the column to be scanned in the longitudinal direction. In addition, the reading unit 130 sets an initial value (for example, 0) to the Y coordinate for specifying the location of the row to be scanned in the lateral direction.

Next, in S902, the reading unit 130 scans a business form in the longitudinal direction at the X coordinate set in S901, and thus extracts the intersections between the scan line in the longitudinal direction and the ends of the business form as end points of the business form and inputs the coordinates of the extracted end points to the skew angle calculation unit 140.

In detail, the reading unit 130 extracts the location where the color of the scanned location changes from the background color to the business-form color (color other than the background color) as the first end point, and then, extracts the location where the color of the scanned location changes from the business-form color to the background color as the second end point. Then, the reading unit 130 inputs the coordinates of the extracted first and second end points to the skew angle calculation unit 140.

Next, in S903, the reading unit 130 determines the location to be scanned next. In detail, the reading unit 130 adds a predetermined value (for example, 1) to the X coordinate for specifying the location of the column to be scanned in the longitudinal direction.

Next, in S904, the reading unit 130 scans the business form in the longitudinal direction at the X coordinate obtained after the predetermined value is added in S903, and thus extracts the intersections between the scan line in the longitudinal direction and the ends of the business form as end points of the business form and inputs the coordinates of the extracted end points to the skew angle calculation unit 140.

In detail, the reading unit 130 extracts the location where the color of the scanned location changes from the background color to the business-form color (color other than the background color) as the first end point, and then, extracts the location where the color of the scanned location changes from the business-form color to the background color as the second end point. Then, the reading unit 130 inputs the coordinates of the extracted first and second end points to the skew angle calculation unit 140.

Next, in S905, the skew angle calculation unit 140 calculates the angle of the straight line connecting the coordinates of the first end point previously input and the coordinates of the first end point most recently input. In addition, the skew angle calculation unit 140 calculates the angle of the straight line connecting the coordinates of the second end point input previously input and the coordinates of the second end point most recently input.

Next, in S906, the reading unit 130 determines whether or not scanning in the longitudinal direction has been all completed. In a case where the reading unit 130 determines that the scanning in the longitudinal direction has not been all completed (No in S906), the process returns to S903. In contrast, in a case where the reading unit 130 determines that the scanning in the longitudinal direction has been all completed (Yes in S906), the process proceeds to S907.

Next, in S907, the reading unit 130 scans the business form in the lateral direction at the Y coordinate set in S901, and thus extracts the intersections between the scan line in the lateral direction and the ends of the business form as end points of the business form and inputs the coordinates of the extracted end points to the skew angle calculation unit 140.

In detail, the reading unit 130 extracts the location where the color of the scanned location changes from the background color to the business-form color (color other than the background color) as the first end point, and then, extracts the location where the color of the scanned location changes from the business-form color to the background color as the second end point. Then, the reading unit 130 inputs the coordinates of the extracted first and second end points to the skew angle calculation unit 140.

Next, in S908, the reading unit 130 determines the location to be scanned next. In detail, the reading unit 130 adds a predetermined value (for example, 1) to the Y coordinate for scanning in the lateral direction.

Next, in S909, the reading unit 130 scans the business form in the lateral direction at the Y coordinate obtained after the predetermined value is added in S908, and thus extracts the intersections between the scan line in the lateral direction and the ends of the business form as end points of the business form and inputs the coordinates of the extracted end points to the skew angle calculation unit 140.

Next, in S910, the skew angle calculation unit 140 calculates the angle of the straight line connecting the coordinates of the first end point input previously input and the coordinates of the first end point most recently input. In addition, the skew angle calculation unit 140 calculates the angle of the straight line connecting the coordinates of the second end point previously input and the coordinates of the second end point most recently input.

Next, in S911, the reading unit 130 determines whether or not the scanning in the lateral direction has been all completed. In a case where the reading unit 130 determines that the scanning in the lateral direction has not been all completed (No in S911), the process returns to S908. In contrast, in a case where the reading unit 130 determines that the scanning in the lateral direction has been all completed (Yes in S911), the process proceeds to S912.

Next, in S912, the skew angle calculation unit 140 calculates the skew angle according to all the angles calculated in S905 and all the angles calculated in S910. The skew angle calculation unit 140 inputs the calculated skew angle to the circumscribed region detection unit 150.

Next, in S913, the circumscribed region detection unit 150 generates an image after a first skew correction obtained by rotating the scanned and read business-form image by the skew angle input in S912.

Next, in S914, the circumscribed region detection unit 150 scans the image after the first skew correction generated in S913, and thus calculates the coordinates of the four corner points of the circumscribed region in the image after the first skew correction. The circumscribed region detection unit 150 inputs the calculated coordinates of the four corner points to the image cutout unit 160.

Next, in S915, the image cutout unit 160 converts the coordinates of the four corner points of the circumscribed region in the image after the first skew correction, the coordinates being calculated in S914, into the coordinates of the four corner points of the circumscribed region in the business-form image.

Next, in S916, the image cutout unit 160 cuts out a business-form image after cutout from the business-form image according to the coordinates of the four corner points of the circumscribed region in the business-form image, the coordinates being obtained as a result of conversion in S915 and a parameter for specifying the cutout range where the business-form image after cutout is cut.

Next, in S917, the image cutout unit 160 generates an image after a second skew correction by rotating the business-form image after cutout obtained as a result of cutout in S916 by the skew angle input in S912, and stores the generated image after the second skew correction in the image storing unit 170.

Effect of the Present Embodiment

According to the image reading device 100 according to the above-described present embodiment, since the image cutout unit 160 cuts out the image of the business form from the image read by the reading unit 130 according to the coordinates of the four corner points of the circumscribed quadrangle, image data without a missing part can be obtained even in a case where the business form is not rectangular. In addition, even if a business form with a protruding portion and a business form without a protruding portion are mixedly present, the business forms can be collectively read. Furthermore, even if the protruding amount or the protruding position varies, image data without a missing part can be stably obtained. Furthermore, image data of a rectangular image can be obtained.

In addition, every time the circumscribed region detection unit 150 scans the image after the first skew correction, the circumscribed region detection unit 150 calculates the number of continuous pixels in the color other than black included in the scanned range. In a case where the calculated number of pixels consecutively exceeds the first value second-value times, the circumscribed region detection unit 150 detects the location scanned when the number of continuous pixels exceeds the first value at first as a side of the circumscribed quadrangle. Thus, it is possible to detect the circumscribed region of the business form without erroneously recognizing the lateral-line noise 601 in the lateral direction and the longitudinal-line noise 602 in the longitudinal direction as the business form.

In addition, a tab and a business form can be distinguished from each other by setting the first value to be smaller than the number of pixels in the longitudinal direction of the tab included in the business form.

In addition, every time the circumscribed region detection unit 150 scans the image after the first skew correction, the circumscribed region detection unit 150 calculates the number of continuous pixels in the color other than black included in the scanned range. In a case where the calculated number of pixels exceeds the first value, the circumscribed region detection unit 150 traces the numbers of pixels calculated so far, and detects the location immediately before the location where the number of pixels becomes 0 as a side of the circumscribed quadrangle. Thus, the image data of the protruding business form without a missing part can be obtained.

In the foregoing, the invention made by the inventors of the present invention has been concretely described based on the embodiment. However, it is needless to say that the present invention is not limited to the foregoing embodiment and various modifications and alterations can be made within the scope of the present invention.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An image reading device including a reading unit which reads an image of a business form, the image reading device comprising:
    a skew angle calculation unit which calculates a skew angle used for correcting inclination of the business form according to image data of the image read by the reading unit;
    a circumscribed region detection unit which generates an image after a first skew correction obtained by rotating the image according to the skew angle, scans the generated image after the first skew correction, and thus detects a circumscribed quadrangle circumscribed around the image of the business form and included in the image after the first skew correction; and
    an image cutout unit which cuts out a business-form image after cutout from the image read by the reading unit, according to the circumscribed quadrangle.

2. The image reading device according to claim 1,
    wherein the image cutout unit generates an image after a second skew correction obtained by rotating the cutout image of the business form according to the skew angle, and stores the generated image after the second skew correction in an image storing unit.

3. The image reading device according to claim 1,
wherein the reading unit reads the image by scanning the business form placed on a background section whose color is black, and every time the circumscribed region detection unit scans the image after the first skew correction, the circumscribed region detection unit calculates a number of continuous pixels in a color other than black included in a scanned range, and in a case where the calculated number of pixels consecutively exceeds a first value second-value times, the circumscribed region detection unit detects a location scanned when the number of continuous pixels exceeds the first value at first as a side of the circumscribed quadrangle.

4. The image reading device according to claim 3,
wherein the first value is smaller than the number of pixels in a longitudinal direction of a tab included in the business form.

5. The image reading device according to claim 1,
wherein the reading unit reads the image by scanning the business form placed on a background section whose color is black, and every time the circumscribed region detection unit scans the image after the first skew correction, the circumscribed region detection unit calculates a number of continuous pixels in a color other than black included in a scanned range, and in a case where the calculated number of pixels exceeds a first value, the circumscribed region detection unit traces the numbers of pixels calculated so far, and detects a location immediately before a location where the number of pixels becomes 0 as a side of the circumscribed quadrangle.

6. An image reading method in an image reading device including a reading unit that reads an image of a business form, the method comprising:

a skew angle calculation step in which a skew angle calculation unit calculates a skew angle used for correcting inclination of the business form according to image data of the image read by the reading unit;

a circumscribed region detection step in which a circumscribed region detection unit generates an image after a first skew correction obtained by rotating the image according to the skew angle, scans the generated image after the first skew correction, and thus detects a circumscribed quadrangle circumscribed around the image of the business form and included in the image after the first skew correction; and an image cutout step in which an image cutout unit cuts out a business-form image after cutout from the image read by the reading unit, according to the circumscribed quadrangle.

7. An image reading program stored in a non-transitory computer readable storage medium causing a computer of an image reading device including a reading unit that reads an image of a business form to execute a process, the process including:

a skew angle calculation step in which a skew angle calculation unit calculates a skew angle used for correcting inclination of the business form according to image data of the image read by the reading unit;

a circumscribed region detection step in which a circumscribed region detection unit generates an image after a first skew correction obtained by rotating the image according to the skew angle, scans the generated image after the first skew correction, and thus detects a circumscribed quadrangle circumscribed around the image of the business form and included in the image after the first skew correction; and an image cutout step in which an image cutout unit cuts out a business-form image after cutout from the image read by the reading unit, according to the circumscribed quadrangle.

* * * * *